United States Patent
Tuggle, Jr.

(10) Patent No.: US 6,390,510 B1
(45) Date of Patent: May 21, 2002

(54) DRYER DUCT AND SWIVEL CONNECTION THEREFOR

(75) Inventor: William H. Tuggle, Jr., Spring Lake, MI (US)

(73) Assignee: Builder's Best, Inc., Jacksonville, TX (US)

(*) Notice: Subject to any disclaimer, the term of this patent is extended or adjusted under 35 U.S.C. 154(b) by 0 days.

(21) Appl. No.: 09/491,189

(22) Filed: Jan. 25, 2000

Related U.S. Application Data

(60) Provisional application No. 60/137,811, filed on Jun. 4, 1999.

(51) Int. Cl.[7] ............................................. F16L 27/00
(52) U.S. Cl. ..................................... 285/278; 285/260
(58) Field of Search .................................. 285/260, 278, 285/280

(56) References Cited

U.S. PATENT DOCUMENTS

| | | | |
|---|---|---|---|
| 1,291,251 A | | 1/1919 | Teed |
| 1,525,538 A | | 2/1925 | Evans |
| 1,532,395 A | * | 4/1925 | Fulton ..................... 285/280 X |
| 1,861,296 A | | 5/1932 | Braly |
| 2,095,702 A | | 10/1937 | Johnson |
| 2,410,786 A | | 11/1946 | Mallory |
| 3,114,567 A | * | 12/1963 | Colley ..................... 285/260 X |
| 3,727,949 A | | 4/1973 | Kleykamp et al. |
| 3,809,412 A | | 5/1974 | Glover |
| 3,897,090 A | | 7/1975 | Maroschak |
| 3,926,222 A | | 12/1975 | Shroy et al. |
| 4,014,569 A | | 3/1977 | Thorp et al. |
| 4,015,961 A | | 4/1977 | Howard et al. |
| 4,037,862 A | | 7/1977 | Thorp et al. |
| 4,152,014 A | | 5/1979 | Soeffker |
| 4,345,805 A | | 8/1982 | Finley et al. |
| 4,598,692 A | | 7/1986 | Hitch |
| 4,625,998 A | | 12/1986 | Draudt et al. |
| 5,121,948 A | | 6/1992 | Anderson et al. |
| 5,133,579 A | | 7/1992 | Anderson et al. |

FOREIGN PATENT DOCUMENTS

| | | | | |
|---|---|---|---|---|
| DE | 1094056 | * | 10/1959 | ................. 285/280 |

* cited by examiner

Primary Examiner—Lynne H. Browne
Assistant Examiner—John R. Cottingham
(74) Attorney, Agent, or Firm—McGarry Bair LLP

(57) ABSTRACT

The invention relates to a swivel connection for a flexible dryer duct. The swivel connection is comprised of two sleeves, one of which can slide within the other. Each of the sleeves can be connected to a section of duct. The inner sleeve has an outwardly projecting flange that can engage an inwardly projecting flange on the outer sleeve, preventing the sleeves from being pulled apart, but allowing relative rotational movement between the sleeves.

29 Claims, 2 Drawing Sheets

DRYER DUCT AND SWIVEL CONNECTION THEREFOR

This appln claims benefit of Prov. No. 60/137,811 filed Jun. 4, 1999.

BACKGROUND OF THE INVENTION

1. Field of the Invention

The invention relates generally to flexible, expandable, duct for use with household appliances, especially clothes dryers. The invention relates more particularly to a duct having one or more torque-relieving swivel connections having a simplified configuration to facilitate cost-effective construction and assembly.

2. Related Art

Flexible helical duct is widely used to direct the exhaust air of household appliances, such as clothes dryers. The flexible helical duct is typically made from a thin metal having a continuous helical ridge, separated by a continuous helical valley. The longitudinal expansion or contraction of the duct causes a rotation of the duct about its longitudinal axis. The rotation generates a torque that causes twisting and buckling of the duct. It is known to use a swivel connection at one or both ends of the duct to relieve the torque to reduce or eliminate the twisting and buckling of the duct. The known swivel connections employ a relatively complex rotary joint, which requires multiple manufacturing steps, thereby increasing the cost. Cost is an important consideration in the market success of flexible ducts. Because of the relatively large volumes and the fungible nature of competing products, a small cost advantage can provide a substantial competitive advantage. Therefore, there is always a strong desire and need to reduce cost.

Swivel connections are also found on non-longitudinally expanding duct, such as a plastic duct with a helical ridge. One such swivel connection comprises a collar that is threaded onto an end of the plastic duct and a sleeve mounted to the end of a different duct and which slidably receives and retains the collar. Other instances of prior teaching call for the threaded attachment of the end of the duct to the swivel connection. This requires complex manufacturing and assembly steps not needed with the present invention.

SUMMARY OF THE INVENTION

The invention relates to a swivel connection for connecting two ducts to each other, end-to-end, so that they are rotatable relative to each other. In one aspect of the invention, the swivel connection includes a pair of sleeves, one of which is slidable within the other. A first sleeve has a first end, a second end, and a flange spaced from the first end and extending outwardly from the sleeve. The second sleeve has a first end, a second end, and a shoulder spaced from the first end and extending inwardly from the sleeve. Both the flange and the shoulder extend a sufficient distance so that at least a portion of the flange and the shoulder abut each other upon slidable insertion of the first sleeve into the second sleeve. When thus inserted, the flange and the shoulder will prevent separation of the first and second sleeves from each other and an axial direction while permitting the first and second ducts to rotate relative to each other.

Preferably, the sleeves each have a circular cross section and the flange and shoulder will be annular and continuous. In one embodiment, the flange and shoulder are each located adjacent to the first end of the respective sleeve.

The flange and shoulder can each be formed of a rolled edge, a lip, or a simple protruding projection. Preferably, the sleeves are formed of thin metal, but they also can be formed of integrally molded plastic.

BRIEF DESCRIPTION OF THE DRAWINGS

The invention will now be described with reference to the drawings wherein.

DETAILED DESCRIPTION

Figure 2:
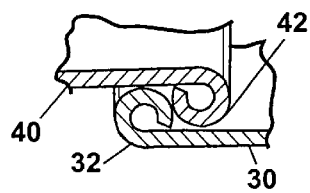
FIG. 2 is an enlarged cross section of a portion of the swivel connection in the duct of FIG. 1.
Figure 1:
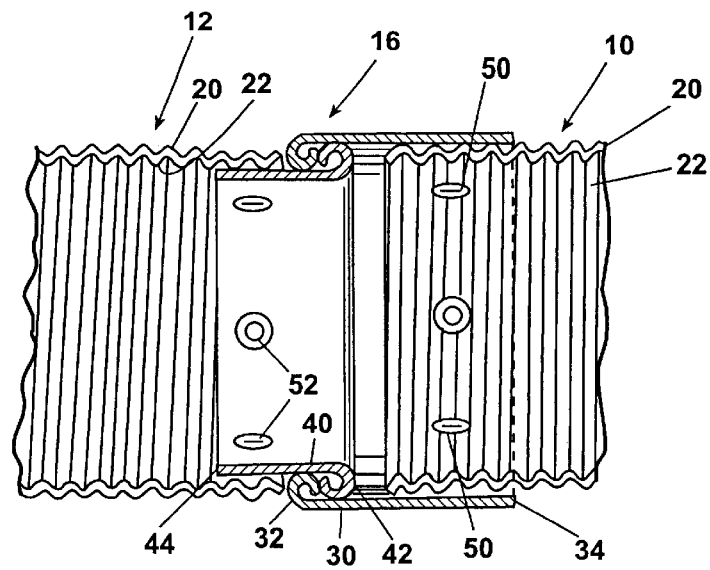
FIG. 1 is a cross-sectional view of a first embodiment of a duct with a swivel connection in accordance with the present invention.

Referring now to the drawings and to FIGS. 1 and 2 in particular, a first embodiment of a dryer duct assembly is shown and comprises a first portion of thinwalled, metal, helical duct 10 and a second portion of thin-walled, metal, helical duct 12, connected by a swivel connection assembly 16. Said duct is formed by conventional methods whereby the thin wall is provided with helical convolutions producing a plurality of alternating ridges 20 and valleys 22 when viewed in cross section as in FIG. 1. In reality, a single continuous helical ridge and a single contiguous helical valley define the shape of the duct. The apexes of the ridges 20 and valleys 22 act as integral joints providing for the expansion and contraction of the duct under corresponding tensile and compressive loads, respectively.

The swivel connection assembly 16 comprises a female sleeve 30 and a male sleeve 40, each having an end fixedly connected to the corresponding helical duct 10, 12. Toward the other end of each sleeve is a projection formed by rolled flanges 32, 42, respectively, which cooperate to rotatably connect the sleeves 30, 40 and, thus, the ducts 10, 12. Each projection is in the form of an inwardly projecting shoulder or an outwardly projecting flange.

Each sleeve of the first embodiment is shown to be of a cylindrical shape, constructed of metal with a wall thickness corresponding with that of the helical metal duct and terminating in its rolled flange. The female sleeve 30 is shown adjacent to and overlapping the first portion of the duct 10. The inner diameter 31 of the female sleeve 30 is preferably larger than the outer diameter of the duct 14, which is equal to the diameter of the ridges 20, to permit the duct 14 to be received within the female sleeve 30. Correspondingly, the male sleeve 40 is shown adjacent and interior to the second duct portion 12. The outer diameter 41 of the male sleeve 40 is somewhat smaller than the inner diameter of the duct 16, which corresponds to the diameter of the valleys 22, to permit the male sleeve 40 to be received within the duct 12.

The female sleeve flange 32 is rolled inwardly and the male sleeve flange 42 is rolled outwardly. Preferably, the inner diameter of the female sleeve 30 is slightly larger than the diameter of the male sleeve flange 42. The outer diameter of the male sleeve 40 is smaller than the diameter of the female flange 32. The assembly of these two pieces is accomplished by sliding an unrolled or plain end 44 of the male sleeve 40 through an unrolled or plain end 34 of the female sleeve 30 until the rolled flanges contact one another. Thus, the outwardly rolled flange 42 is longitudinally retained in position by abutting contact with the inwardly rolled flange 32. Thus, the sleeves are fittingly retained in a slideable axial relationship that permits rotary movement relative to one another.

To assemble the duct assembly, the male sleeve 40 is inserted into the unrolled end of the female sleeve 30 until at least a portion of the unrolled end of the male sleeve 40 extends beyond the flange 32 of the female sleeve. The unrolled end of both sleeves is then affixed to the corresponding duct. Preferably, the sleeves are attached to the duct portions by fasteners 50, 52, that leave as smooth a surface as possible on the inside of the duct in order to minimize places for lint to catch. Such fasteners include self-piercing rivets or clinch locks. Of course, other fasteners such as selftapping screws or "pop" rivets can be used with less effect, as well as other methods such as spot welds or the like. Attachment of the female sleeve 30 to the first duct portion 10 is accomplished by preferably screwing a plurality of self-tapping screws through the female sleeve 30 and into an adjacent ridge 20 or ridges of the duct. Similarly for the male sleeve 40, except that the fastener penetrates the valley 22 of the second duct portion 12 before attaching to the sleeve 40. For the application of aluminum rivets or screws that are not self-tapping, holes must first be drilled or punched through the sleeve and duct to receive the fastener.

Although one of the sleeves is illustrated having a diameter sized to be received within a duct and the other sleeve is illustrated as being sized to receive a duct, it is within the scope of the invention for each sleeve to be sized to be received within a duct or to receive a duct. Depending on the selected sleeve diameter, it may be necessary to shape the duct or alter the collars to obtain an abutting relationship between the collars.

Figure 4:
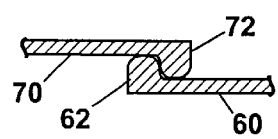
FIG. 4 is an enlarged cross section of a portion of the swivel connection in the duct of FIG. 3.
Figure 3:
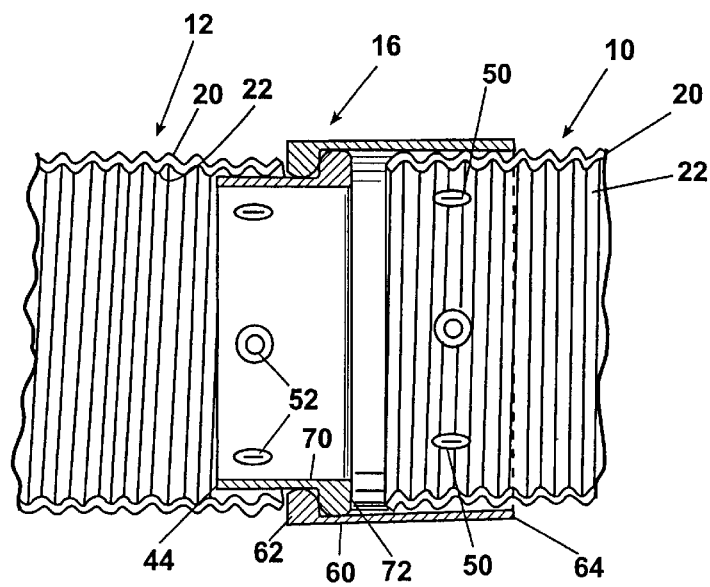
FIG. 3 is a cross-sectional view of a second embodiment of a duct with a swivel connection in accordance with the present invention.

A second embodiment of a duct assembly is shown in FIGS. 3–4 and is comprised of thin-walled, metal, helical duct as previously described in combination with a new swivel connection 58. Since the flexible duct and fasteners are common between the first and second embodiments, they are not shown or described in detail. The swivel connection assembly 58 shown in FIG. 3 is comprised of a female sleeve 60 and a male sleeve 70. Both sleeves shown are to be of a cylindrical shape, constructed of injection molded plastic and terminating in a protruding projection. The female sleeve 60 has a shoulder or projection 62 that protrudes inwardly and an opposing plain end 64. The male sleeve 70 has a flange or projection 72 that is protrudes outwardly and an opposing plain end 74. Preferably, the inner diameter of the female sleeve 60 is slightly larger than the diameter of the projection 72 of the male sleeve 70. Likewise, the outer diameter of the male sleeve 70 should have a diameter corresponding to the smaller diameter of the projection 62 of the female sleeve 60.

The assembly of these two sleeves is generally the same as for the first embodiment. The plain end 74 of the male sleeve 70 extends through the plain end 64 of the female sleeve 60 until the protruding projections contact one another. Thus, the outwardly protruding projection 72 of the male sleeve 70 is retained in position by the interior diameter 61 and the inwardly protruding projection 62 of the female sleeve 60. The female sleeve is restricted in movement by the end of the second duct portion 12 when said duct is attached to the male sleeve as will be depicted shortly. These two sleeves are thereby fittingly retained in a slideable axial relationship that permits rotary movement relative to one another.

The female sleeve 60 is shown adjacent to and overlapping the first portion of the duct 10. The inner diameter 61 of the female sleeve 60 is somewhat larger than the outer diameter of the duct 14, which is equal to the diameter of the ridges 20. Correspondingly, the male sleeve 70 is shown adjacent and interior to the second portion of the duct 12. The outer diameter 71 of the male sleeve 70 is somewhat smaller than the inner diameter of the duct 16, which corresponds to the diameter of the valleys 22.

The sleeves are attached to the duct portions by fasteners 50 and 52. Attachment of the female sleeve 60 to the first duct portion 10 is accomplished by preferably screwing a plurality of self-tapping screws through the female sleeve 60 and into an adjacent ridge 20 or ridges of the duct. Similarly for the male sleeve 70, except that the fastener penetrates the valley 22 of the second duct portion 12 before attaching to the sleeve 70. For the application of aluminum rivets or screws that are not self-tapping, holes must first be drilled or punched through the sleeve and duct to receive the fastener.

Figure 5:
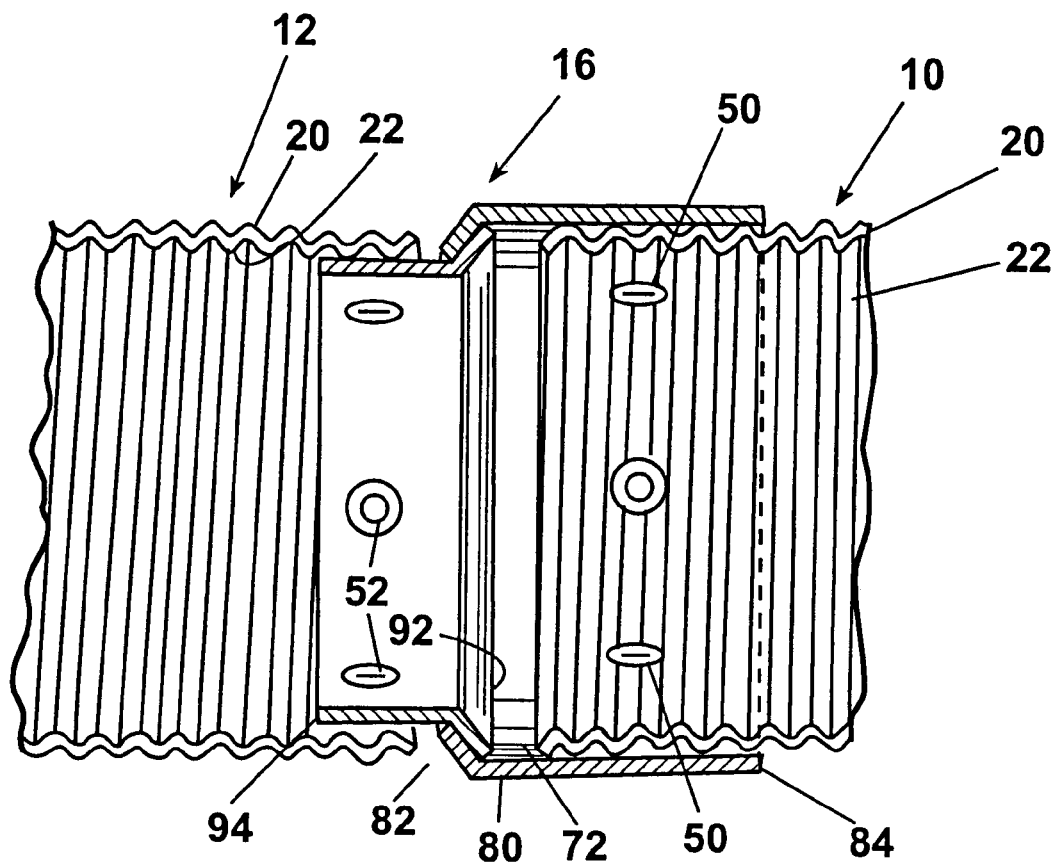
FIG. 5 is a cross-sectional view of a third embodiment of a duct with a swivel connection in accordance with the present invention.
Figure 6:
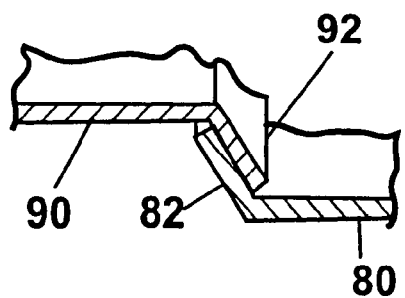
FIG. 6 is an enlarged cross section of a portion of the swivel connection in the duct of FIG. 5.

A third embodiment of the dryer duct assembly is shown in FIGS. 5 and 6, comprising a flexible helical duct in combination with a new swivel connection. Like numerals will be used to describe like parts of the various embodiments.

The swivel connection assembly 78 shown in FIGS. 5 and 6 is comprised of a female sleeve 80 and a male sleeve 90. Both sleeves shown are to be of a cylindrical shape, constructed of thin-walled metal or injection-molded plastic and terminating in a lip that extends at an angle acute to a radius of the sleeves. However, it is within the scope of the invention for the lip to extend radially from the sleeve. The female sleeve 80 has a shoulder or lip 82 that is directed inwardly and an opposing plain end 84. The male sleeve 90 has a flange or lip 92 that is directed outwardly and an opposing plain end 94. Preferably, the inner diameter of the female sleeve 80 is slightly larger than the diameter of the outwardly directed lip 92 of the male sleeve 90. Likewise, the outer diameter of the male sleeve 90 should have a diameter corresponding to the smaller diameter of the inwardly directed lip 82 of the female sleeve 80.

The assembly of the sleeves is accomplished by sliding the plain end 94 of the male sleeve 90 through the plain end 84 of the female sleeve 80 until the complimentary lips 82,92 contact one another. Thus, the outwardly directed lip 92 of the male sleeve 90 is retained in position by the interior diameter 81 and the inwardly directed lip 82 of the female sleeve 80. The female sleeve is restricted in movement by the end of the second duct portion 12 when said duct is attached to the male sleeve as will be depicted presently. The sleeves are thereby fittingly retained in a slideable axial relationship that permits rotary movement relative to one another.

The female sleeve 80 is shown adjacent to and overlapping the first portion of the duct 10. The inner diameter 81 of the female sleeve 80 is somewhat larger than the outer diameter of the duct 14, which is equal to the diameter of the ridges 20. Correspondingly, the male sleeve 90 is shown adjacent and interior to the second portion of the duct 12. The outer diameter 91 of the male sleeve 90 is somewhat smaller than the inner diameter of the duct 16, which corresponds to the diameter of the valleys 22.

The sleeves are attached to the duct portions by fastening means 50 and 52, as disclosed previously.

Any features in the foregoing embodiments can be selectively incorporated into other embodiments. For example, female sleeve 30 can accommodate male sleeve 70 or 90 as discussed relative to the inner and outer diameters of each sleeve. All possible derivations known to those having ordinary skill in the art with the present disclosure before them are likewise contemplated for use. For example, non-metal helical duct such as wire reinforced vinyl, will also have a tendency to twist as it is expanded, although perhaps to a lesser degree. Sleeves having shapes other than a right circular cylinder can be used in lieu of the embodiments described. Nevertheless, it is within the scope of the invention to incorporate the swivel embodiments described into any segmented duct where a swivel connection is desired.

Additionally, it is envisioned that a plurality of swivel connections can be used to connect multiple duct segments. The swivel connections can be of the same type or can include any combination of the various embodiments described above. Moreover, these connections may be located at a standard distance, whereas different lengths of swivel duct would be comprised of varying numbers of standard length sections of duct with a swivel connection between each section. The swivel connections can also be used to connect various connectors, such as elbows, to other connectors or to other ducts.

While particular embodiments of the invention have been shown, it will be understood, of course, that the invention is not limited thereto since modifications may be made by those skilled in the art, particularly in light of the foregoing teachings. Reasonable variation and modifications are possible within the scope of the foregoing invention disclosure, without departing from the spirit of the invention.

What is claimed is:

1. A swivel connection for connecting two ducts to each other, end to end, so that they are rotatable relative to each other, the swivel connection comprising:
   a first sleeve having a first end, second end, and a flange spaced from the first end and extending outwardly from the first sleeve;
   a second sleeve having a first end, a second end, and a shoulder spaced from the first end and extending inwardly from the second sleeve, and the second sleeve having an inner periphery greater than an outer periphery of the flange to permit the slidable insertion of the first sleeve and flange into the second sleeve;
   the flange and the shoulder extending a sufficient distance that at least a portion of the flange and the shoulder abut each other upon the slidable insertion of the first sleeve into the second sleeve; and
   wherein the first sleeve and flange are telescopically inserted in a predetermined axial direction within the second sleeve with the first sleeve first end extending through the second sleeve second end to form the swivel connection, whereby the first sleeve first end is positioned for connection to a first duct and the second sleeve second end is positioned for connection to a second duct and the flange and the shoulder will prevent separation of the first and second sleeves in the predetermined axial direction while permitting the first and second ducts to rotate relative to each other.

2. A swivel connection according to claim 29 wherein one of the first and second sleeves has a circular cross section.

3. A swivel connection according to claim 2 wherein the other of the first and second sleeves has a circular cross section.

4. A swivel connection according to claim 29 wherein one of the flange and shoulder is continuous.

5. A swivel connection according to claim 4 wherein one of the flange and shoulder is annular.

6. A swivel connection according to claim 1 wherein one of the flange and shoulder is located adjacent the first end of its associated sleeve.

7. A swivel connection according to claim 6 wherein the flange is located adjacent the first end of the first sleeve and the shoulder is located adjacent the second end of the second sleeve.

8. A swivel connection according to claim 1 wherein the flange is selected from one of a rolled edge, a lip, and a protruding projection.

9. A swivel connection according to claim 8 wherein the shoulder is selected from one of a rolled edge, a lip, and a protruding projection.

10. A swivel connection according to claim 1 wherein at least one of the first and second sleeves is formed of a thin metal.

11. A swivel connection according to claim 1 wherein at least one of the first and second sleeves is formed of integrally molded plastic.

12. A swivel connection according to claim 1 wherein the first sleeve further comprises a lip to form the flange and the second sleeve further comprises a lip to form the shoulder.

13. A swivel connection according to claim 12 wherein the lips form an acute angle relative to their corresponding sleeve.

14. A swivel connection according to claim 1 wherein the first sleeve further comprises a rolled edge to form the flange and the second sleeve further comprises a rolled edge to form the shoulder.

15. A swivel connection according to claim 11 wherein the first sleeve further comprises a protruding projection to form the flange and the second sleeve further comprises a protruding projection to form the shoulder.

16. A connector comprising:
    a male portion having a generally cylindrical main body with a first diameter, a first end, and a second end, the first end being substantially axially aligned with the main body and the second end having a radially outwardly projecting portion;
    a female portion having a generally cylindrical main body with a second diameter, a first end, and a second end, the first end being substantially axially aligned with the main body and the second end having a radially inwardly projecting portion;
    the first end and second ends of the male portion being sized to slide axially into the first end of the female portion, the first diameter and a third diameter defined by the radially outwardly projecting portion being smaller than the second diameter;
    the first end of the male portion being adapted to slide axially through the second end of the female portion, the first diameter being smaller than a fourth diameter defined by the radially inwardly projecting portion;
    the radially outwardly projecting portion being adapted to engage the radially inwardly projecting portion, the third diameter being larger than the fourth diameter; and
    an engagement interface formed between the male portion and the female portion by the radially outwardly projecting portion and the radially inwardly projecting portion, the interface adapted to inhibit further axial displacement between the male portion and the female portion in one direction only while freely allowing relative rotational displacement about a central axis defined by the cylindrical main bodies of the male portion and the female portion.

17. In a flexible duct assembly of the type wherein two ducts are rotatably connected to each other by a swivel connection, the improvement in the swivel connection comprising:

a first sleeve having a first end, second end, and a flange extending outwardly from the sleeve;

a second sleeve having a first end, a second end, and a shoulder spaced from the first end and extending inwardly from the second sleeve, and the second sleeve having an inner periphery greater than an outer periphery of the flange to permit the slidable insertion of the first sleeve and flange into the second sleeve;

the flange and the shoulder extending a sufficient distance that at least a portion of the flange and the shoulder abut each other upon the slidable insertion of the first sleeve into the second sleeve; and wherein the first sleeve and flange are inserted in a predetermined axial direction into the second sleeve second end until the first sleeve first end extends through the second sleeve first end to form the swivel connection, whereby the first sleeve first end is positioned for connecting to a first duct and the second sleeve second end is positioned for connecting to a second duct, and the flange and the shoulder will prevent separation of the first and second sleeves in the axial direction while permitting the first and second ducts to rotate relative to each other.

18. The improvement according to claim 17 wherein one of the first and second sleeves includes an end slidably received within an end of one of the ducts.

19. The improvement according to claim 18 wherein the other of the first and second sleeves includes an end that slidably receives an end of the other one of the ducts.

20. The improvement according to claim 17 wherein the first sleeve further comprises a lip to form the flange and the second sleeve further comprises a lip to form the shoulder.

21. The improvement according to claim 20 wherein the lips form an acute angle relative to their corresponding sleeve.

22. The improvement according to claim 17 wherein the first sleeve further comprises a rolled edge to form the flange and the second sleeve further comprises a rolled edge to form the shoulder.

23. The improvement according to claim 17 wherein the first sleeve further comprises a protruding projection to form the flange and the second sleeve further comprises a protruding projection to form the shoulder.

24. The improvement according to claim 17 wherein the ducts comprise thin metallic helical tubing.

25. The improvement according to claim 17 wherein the ducts comprise a spiral wire reinforced vinyl material.

26. A connector according to claim 16 wherein the male portion and the female portion each further comprises a lip extending from the second end of the body to form the corresponding projecting portion.

27. A connector according to claim 16 wherein the male portion and the female portion each further comprises a rolled edge extending from the second end of the body to form the corresponding projecting portion.

28. A connector according to claim 16 wherein the male portion and the female portion each further comprises an integrally formed protruding projection extending from the second end of the body to form the corresponding projecting portion.

29. In a flexible duct assembly of the type wherein two ducts are rotatably connected to each other by a swivel connection, the improvement in the swivel connection comprising:

each duct comprises a spiral wire reinforced vinyl material;

a first sleeve having a first end, second end, and a flange extending outwardly from the sleeve;

a second sleeve having a first end, a second end, and a shoulder spaced from the first end and extending inwardly from the second sleeve;

the flange and the shoulder extending a sufficient distance that at least a portion of the flange and the shoulder abut each other upon the slidable insertion of the first sleeve into the second sleeve;

whereby when the first sleeve is received within the second sleeve with the first sleeve first end extending through the second sleeve second end, and when the first sleeve first end is connected to a first duct and the second sleeve second end is connected to a second duct, the flange and the shoulder will prevent separation of the first and second sleeves in an axial direction while permitting the first and second ducts to rotate relative to each other.

* * * * *

UNITED STATES PATENT AND TRADEMARK OFFICE
CERTIFICATE OF CORRECTION

PATENT NO. : 6,390,510 B1
DATED : May 21, 2002
INVENTOR(S) : William H. Tuggle, Jr.

It is certified that error appears in the above-identified patent and that said Letters Patent is hereby corrected as shown below:

Column 5,
Line 61, "claim 29" should be -- claim 1 --.
Line 66, "claim 29" should be -- claim 1 --.

Column 6,
Line 32, "claim 11" should be -- claim 1 --.

Signed and Sealed this

Fifteenth Day of October, 2002

Attest:

Attesting Officer

JAMES E. ROGAN
Director of the United States Patent and Trademark Office